Patented Dec. 20, 1927.

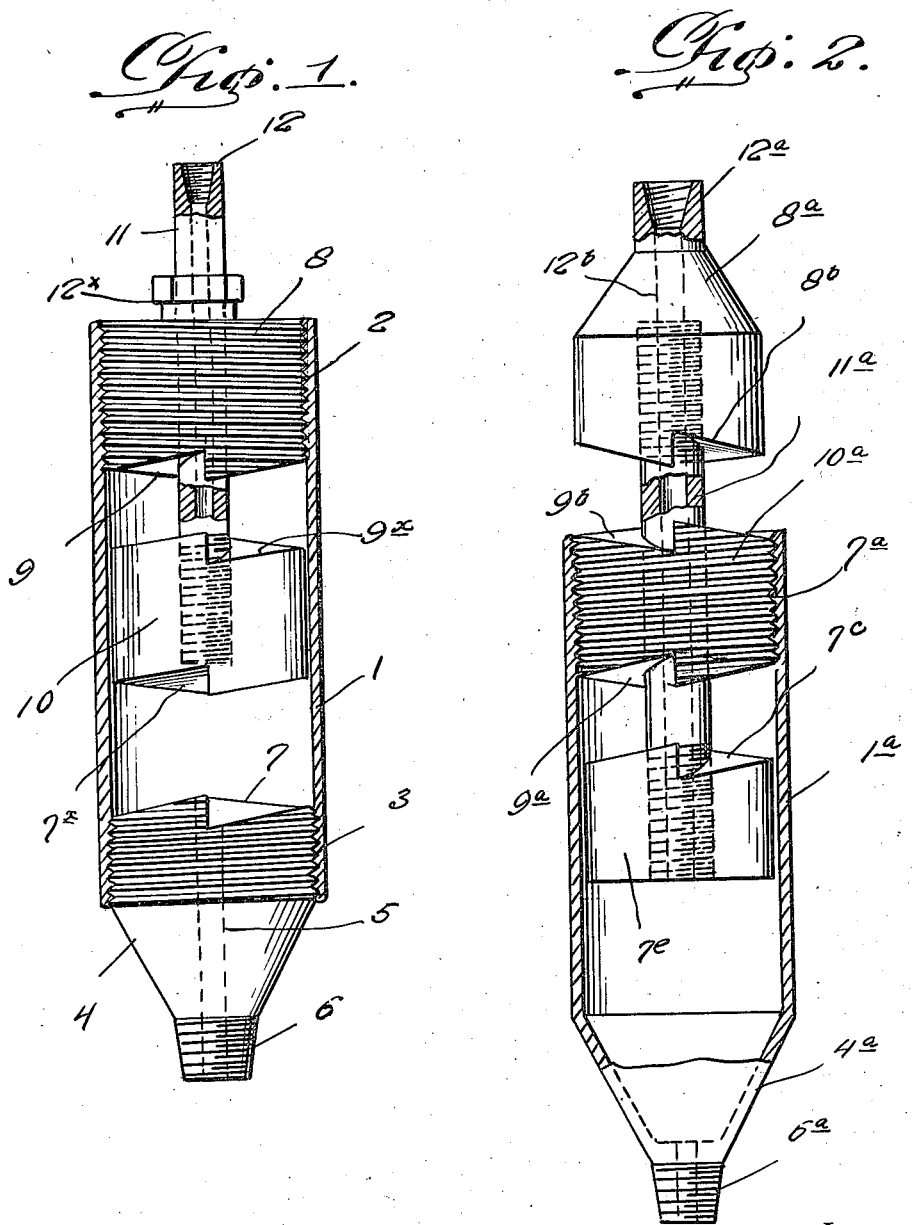

1,653,093

UNITED STATES PATENT OFFICE.

CHARLES T. FLEMING, OF TAFT, CALIFORNIA, ASSIGNOR OF ONE-HALF TO WILLIAM J. HAY, OF TAFT, CALIFORNIA.

JAR FOR FISHING AND DRILLING TOOLS.

Application filed December 23, 1925, Serial No. 77,314. Renewed March 10, 1927.

The general object of my present invention is the provision of a jar for fishing and drilling tools, possessed of a wide range of usefulness and adapted to be used to advantage for the several purposes hereinafter set forth.

The invention consists in the improvement as hereinafter described and definitely claimed.

In the accompanying drawings, forming part of this specification:—

Figure 1 is a view partly in section and partly in elevation illustrative of the embodiment of my invention designed more particularly for use in rotary drilling functions.

Figure 2 is a similar view of the embodiment of my invention designed for use in conjunction with fishing and various kinds of repair work.

Reference will first be had to Figure 1 wherein is illustrated the cylindrical casing 1 of the jar. The said casing 1 is interiorly threaded at its upper and lower end portions as designated by 2 and 3, respectively. Threadedly secured or otherwise appropriately secured in the lower end portion of the casing 1 is a member 4 with a longitudinal central bore 5 for circling purposes and with a taper and threaded lower end 6. The upper face of the member 4 is a clutch face as designated by 7. Threadedly or otherwise appropriately secured in the upper end of the casing 1 is a member 8 with a longitudinal central bore and with a clutch face 9 arranged reversely to the clutch face 7 as will be readily understood.

Arranged and movable rectilinearly and about its axis in the casing 1 is a clutching member 10 with reversely arranged clutch faces 7ˣ and 9ˣ for cooperation with the clutch faces 7 and 9, respectively. The member 10 is provided with a threaded bore whereby it may be connected to the lower end of a tubular member 11, threaded as designated by 12 at its upper end, and also having its lower portion threaded and secured thereby in a threaded bore in the member 10. On the member 8 is a packing gland 12ˣ through which the tubular member 11 is adapted to work.

The jar described is designed for use with a rotary drill, and it will be noted that the member 10 is movable relative to the remainder of the jar; also, that by letting the member 10 down it will engage with the member 4 while by lifting the same member 10 it will engage with the member 8. On the first named engagement the member 10 is adapted to engage and rotate the remainder of the jar, while when in the second engagement and still rotating toward the right with respect to the members 7 and 8, only, said member 10 will bear against the member 8 and bring about the upward jar which is desirable in case it is necessary to loosen a tool.

The bore in the tubular member 11 extends throughout the length of said member and is designed for water circulation purposes. Leakage of water through the longitudinal central bore of the member 8 is effectively prevented. The embodiment illustrated in Figure 2 is for combination fishing of all kinds incident to general repair work capable of being accomplished by rotary outfit. The casing 1ª of the said embodiment is tapered at 4ª and appropriately threaded at 6ª, and the upper end portion of the said casing 1ª is interiorly threaded as designated by 7ª for the engagement of a member 10ª which is fixed to the casing 1ª and is provided with lower and upper reversely arranged clutch faces 9ª and 9ᵇ, respectively. A tubular member 11ª is movable rectilinearly and about its axis in a bore in the member 10ª, and carried on the lower portion of the said tubular member 11ª is a member 7ᵇ with a clutch face 7ᶜ complementary to and adapted to cooperate with the before-mentioned clutch face 9ª. Fixedly secured on the tubular member 11ª is a member 8ª appropriately threaded as designated by 12ª, and at its lower end the said member 8ª is provided with a clutch face 8ᵇ complementary to the before mentioned clutch face 9ᵇ of the member 10ª.

Manifestly the embodiment shown in Figure 2 is adapted for the adequate circulation of water through the bore 12ᵇ of the member 8ª as well as through the bore of the tubular member 11ª. It will also be readily appreciated from Figure 2 that the member 7ᵇ is capable of being clutched to the member 10ª, and that the member 8ª, in turn, is also capable of being clutched to the member 10ª.

It will be manifest from Figure 2 that the member 10ª being held stationary, upward movement of the member 7ᵇ followed by rotation of the said member 7ᵇ toward the right upward jar will be accomplished. Again it will be understood that if the member 10ᵃ be held stationary and the member 8ᵃ be pressed downwardly and turned toward the right downward jar will be accomplished. It will also be appreciated that with every revolution one or two complete jars, as desired, will be brought about either on the up thrust or the down thrust.

It will be further manifest from the foregoing that my novel jars are susceptible of use with any tools that are now in general use for drilling or fishing.

I have specifically described the preferred embodiment of my invention in order to impart an exact understanding of the same. I do not desire, however, to be understood as confining myself to the structure disclosed, nor to the relative arrangement of the elements, my invention being defined by my appended claims within the scope of which structural changes and changes in relative arrangement may be made without affecting my invention.

Having described my invention, what I claim and desire to secure by Letters-Patent, is:—

1. A jar comprising a casing body, members secured in said casing body and spaced apart and having bores and also having confronting reversely arranged clutch faces, and a rectilinearly movable and rotatable member having a tubular portion movable in the bore of one of the first-named members and also having a portion disposed and movable between the confronting faces of said first-named members and provided with reversely arranged clutch faces.

2. A jar comprising a casing body, members secured in said casing body and spaced apart and having bores and also having confronting reversely arranged clutch faces, and a rectilinearly movable and rotatable member having a tubular portion movable in the bore of one of the first-named members and also having a portion disposed and movable between the confronting faces of said first-named members and provided with reversely arranged clutch faces.

In testimony whereof I affix my signature.

CHARLES T. FLEMING.